May 30, 1944.    W. F. DEAN ET AL    2,350,018
METER BOX
Filed Dec. 10, 1940    2 Sheets-Sheet 1
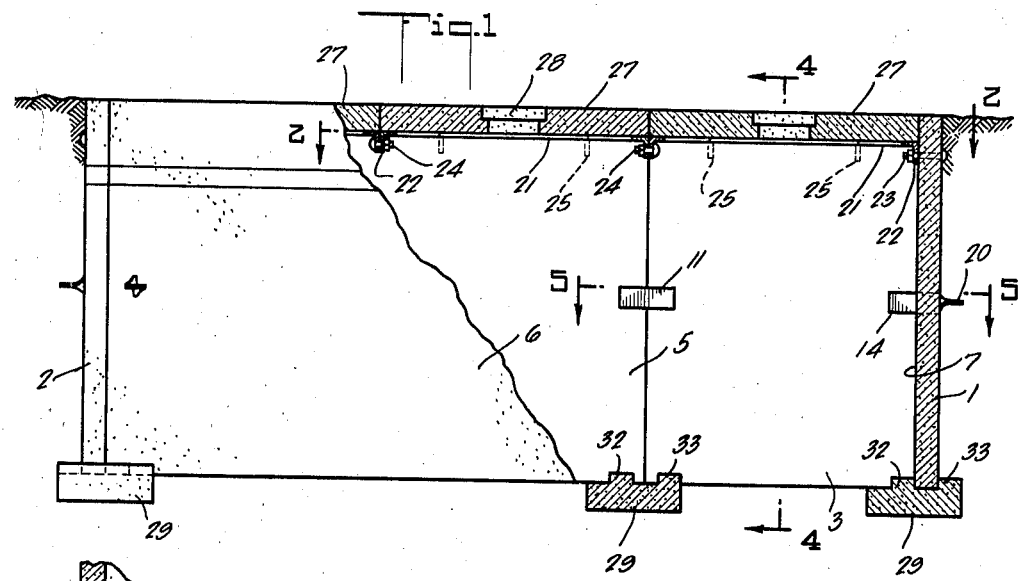
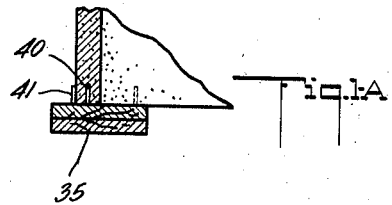
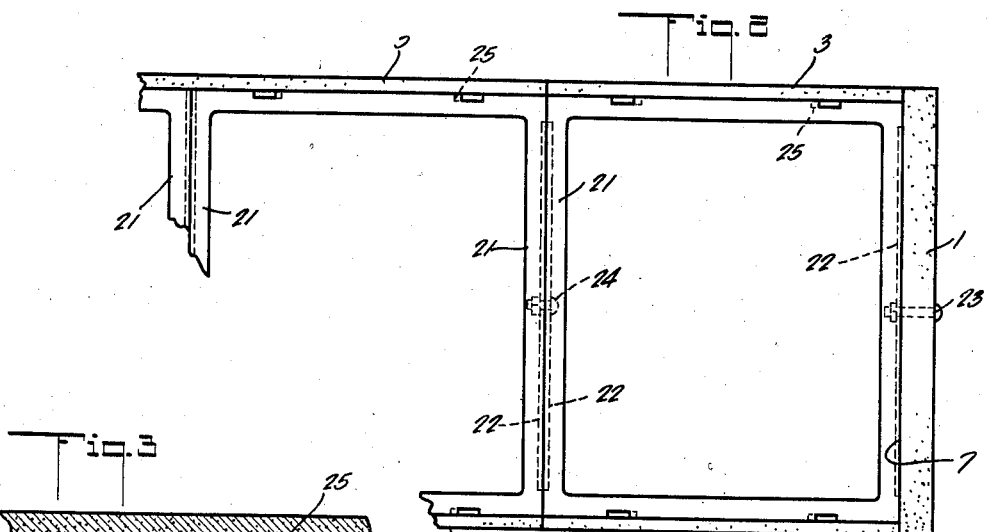
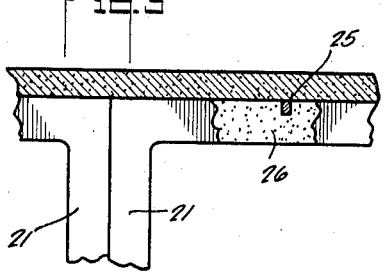
INVENTORS
William F. Dean
Frank M. Brooks
BY John Flam
ATTORNEY

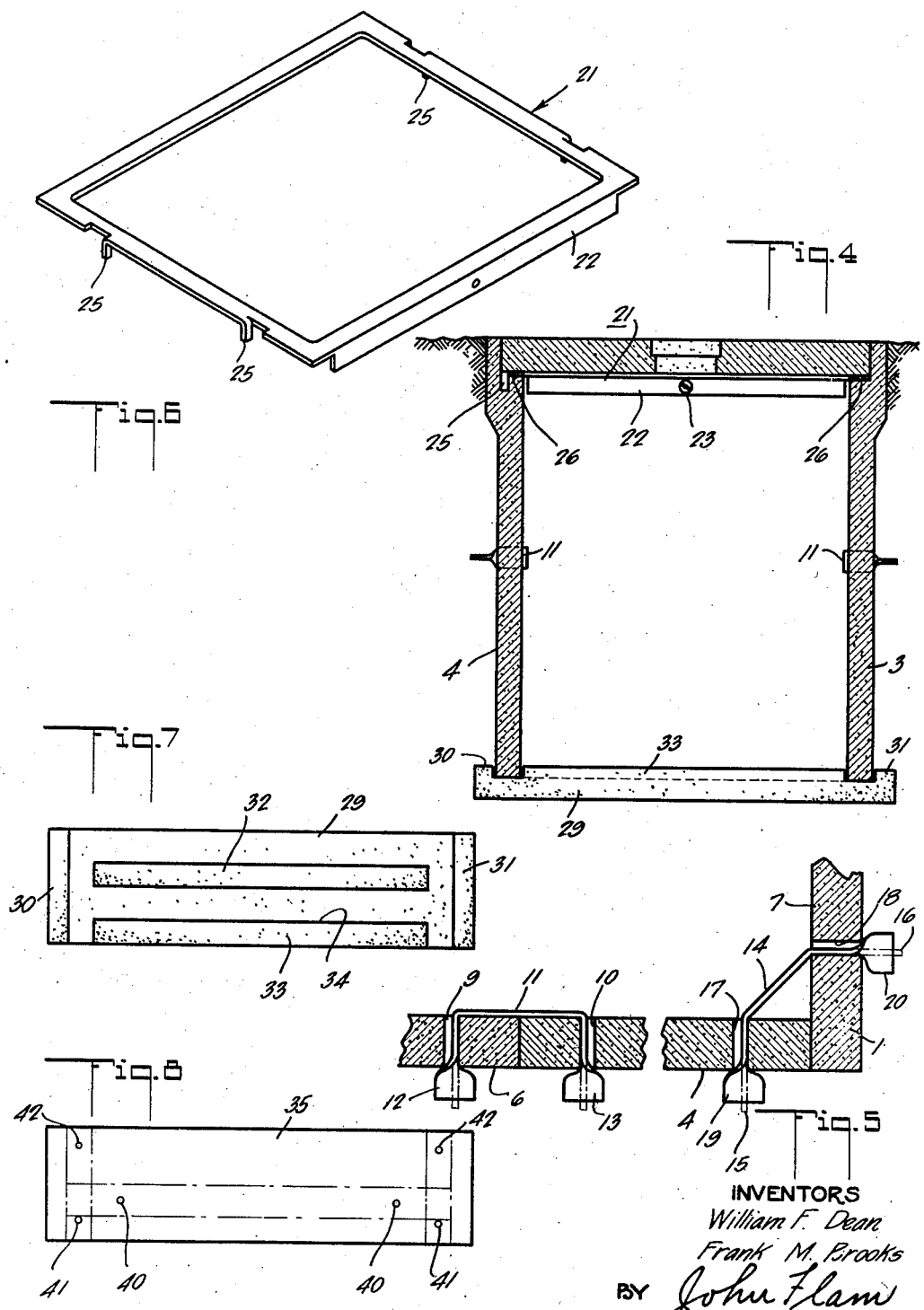

Patented May 30, 1944

2,350,018

UNITED STATES PATENT OFFICE 2,350,018

METER BOX

William F. Dean and Frank M. Brooks, Pasadena, Calif.

Application December 10, 1940, Serial No. 369,442

2 Claims. (Cl. 220—4)

This invention relates to a meter box. Boxes of the general character, often made from concrete or cement, are commonly used out-of-doors to house water meters, gas meters or the like. Usually such boxes are sunk in the ground, and are provided with a removable cover that is substantially flush with the ground, and that can support the loads imposed upon it by ordinary traffic.

In many instances a number of meters are installed side by side, as for apartment house tenants. In such cases, a common meter box to house all of the meters may be provided; and it is desirable to make it possible to utilize a sectional structure whereby the capacity of the box may be altered to suit the number of meters. Also, a pressure regulator may be installed, and the meter box may be so made as to accommodate the regulator along with the meter or meters.

It is one of the objects of this invention to provide an improved meter box structure that may be adapted to house any number of meters and if desired, the pressure regulator as well.

It is another object of this invention to make it possible to build up a meter box of any desired number of sections, as by providing interchangeable side panels and stiffener frames for supporting the panels.

It is still another object of this invention to provide a frame to be used adjacent the top edges of the box that serves not only to brace the structure but also as a seat for the cover, and that may be used either singly or plurally as required by the capacity of the box.

It is still another object of the invention to provide an improved and simplified form of sill upon which the open bottom of the box may rest.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a side elevation, partly in section, of a meter box incorporating the invention;

Fig. 1A is a fragmentary sectional view of a modified form of the invention;

Fig. 2 is a fragmentary top plan view of the meter box illustrated in Fig. 1, the covers being removed;

Fig. 3 is an enlarged fragmentary plan view, partly broken away, of the meter box illustrated in Fig. 1;

Fig. 4 is a sectional view taken along plane 4—4 of Fig. 1;

Fig. 5 is a fragmentary sectional view taken along plane 5—5 of Fig. 1;

Fig. 6 is a pictorial view of a frame structure utilized in connection with the invention; and Figs. 7 and 8 are plan views of several forms of still structures utilized in connection with the invention.

In the specific embodiment illustrated in Figs. 1 to 5 inclusive, the meter box is shown as capable of accommodating three units. For this purpose there are end plates 1 and 2 (Figs. 1, 2 and 5) that are made from concrete or other cementitious product. The side plates 3, 4, 5 and 6 are likewise made of concrete or similar material. These side plates are arranged as shown most clearly in Figs. 2 and 5, to form a container or box of rectangular configuration.

In order to make it possible to form a box of any desired length to accommodate any desired number of meters or regulators, the side plates 3, 4, 5 and 6 may be formed as units capable of being joined together to form a sectional wall at each side of the box. Thus the plates 3 and 5 abut at their longitudinal edges, and similarly plates 4 and 6 abut at their longitudinal edges. More than two plates if desired may be utilized for each side wall. Furthermore, plates 5 and 6 are illustrated as longer than the plates 3 and 4; but these plates may be all of the same size if desired. In the present instance plates 5 and 6 are shown as substantially twice as long as the plates 3 and 4. The end edges of the plates 3, 4, 5 and 6 abut the inner surface 7 of the end plates 1 and 2 (Fig. 5).

The manner in which the side and end plates are fastened together may now be described.

Thus for joining the side plates 3 and 5 or 4 and 6 together, use is made of a structure illustrated most clearly in Fig. 5. Each of the abutting plates is provided respectively with through apertures 9 and 10 adjacent the contacting edges. These apertures are located substantially centrally of the height of the plates. Through the apertures 9 and 10 pass the ends of a bar or strap 11. The ends of the bars project outwardly of the box. Since the bars are made of non-circular metal, such as a flat strip, these projecting ends may be twisted as by the aid of a pair of pliers or the like to occupy the position illustrated by reference characters 12 and 13 of Fig. 5. This twist is made as close to the plates as possible, so as to cause the bar 11 to be held tightly in place against the inner surface of the plates 4 and 5.

Similarly, in order to join the side plates 3, 4, 5 and 6 to the end plates 1 and 2, bars 14 (Fig. 5) are provided. These bars have their ends 15 and 16 projecting respectively through the apertures 17 and 18 formed in the plate. The projecting ends 15 and 16 may then be twisted as illustrated by reference characters 19 and 20 to urge the bar 14 into tight relationship with the plates forming the corner of the box.

The manner of assembly of the plates is simple. They are first placed in proper cooperative relation with each other; then the ends of the bars 11 and 14 may be passed through the respective apertures in the plates from the inside to the outside of the box. These ends are then twisted to the form illustrated in Fig. 5. The bars form effective restraints against separation of the plates.

In order further to hold the plates together, use is made of one or more frames 21, adjacent the top edges of the plates 1 to 6. This frame 21, as shown most clearly in Fig. 6, is in the form of a rectangle made of thin metal. The edges of the frame are formed as substantially horizontal flanges. At those sides of the frame 21 which are transverse to the side plates 3, 4, 5 and 6, vertical flanges 22 are formed.

That frame 21 which is adjacent an end plate 1 or 2 may be fastened to the corresponding end plate by the aid of the flange 22, and a bolt 23 passing through the end plate and the flange. Furthermore, as many of the frames 21 may be placed side by side as required by the length of the sides formed by the plates 3, 4, 5 and 6. In the present instance three such frames 21 are shown, since the box is three times as long as a unit length represented by a frame 21. The frames 21 are joined together by the aid of the vertical flanges 22 and the bolts 24 passing therethrough. The plurality of frames 21 thus form a frame structure, serving as a rigid brace adjacent the top edge of the box.

In order to anchor the side plates 3, 4, 5 and 6 to the frames 21, each of the frames are provided with anchoring projections 25 (Figs. 1, 3 and 6). These projections are struck downwardly in a vertical direction from the horizontal flanges which are adjacent the side plates 3, 4, 5 or 6. They are intended to be accommodated in appropriate recesses formed in the shoulders 26 formed on the inner surfaces of the side plates.

The frames 21 also serve appropriately as a rest for the removable covers 27 (Fig. 1). Each of these covers may be provided with a central aperture 28 serving as a viewing aperture for the meter or other device accommodated within the box.

The frames 21 obviously may be multiplied as desired to conform with the number and length of the side plates 3, 4, 5 and 6. Accordingly it is a simple matter to build up the meter box to accommodate the desired number of units.

The bottom of the meter box is usually kept open. However, sills are usually provided for the bottom edges of the box so as to ensure against undesired settling. As shown most clearly in Figs. 1-4 and 7, one form of sill 29 may be made of concrete or other cementitious material. These sills 29 may be placed underneath the end plates 1 and 2 and also underneath the locality where the sectional side plates are in longitudinal alinement. As shown most clearly in Fig. 7, these concrete sills extend from one side to the other of the box structure. They may be provided with the flanges 30 and 31 adapted to extend exteriorly of the side plates. Furthermore, ribs or projections 32 and 33 are also provided, which form a groove 34 in which the bottom edge of the end plate may be accommodated. The projections 32 and 33 are thus disposed respectively on opposite sides of the bottom edge of these plates.

In place of the concrete sills 29, wood sills such as 35 (Figs. 1A and 8) may be provided. In this case the sills may be formed with upright dowel pins 40 adapted to enter into corresponding apertures in the bottom edges of the end plates. Further to confine the end plates, stop pins 41 may be provided in the sills 35 to engage the outer vertical surface of the end plates. Additional dowel pins 42 are adapted to be received in recesses formed in the bottom edges of the side plates.

What is claimed is:

1. In a box of the character described, end plates, a plurality of side plates to form each side of the box and placed adjacent one another, means for securing said side plates together, and means for maintaining said plates in position, comprising a plurality of similar metal frames each formed as an open rectangle, adapted to have a cover seated thereon, each of said frames having depending flanges on two opposite sides, the other pair of opposite sides having a length corresponding to that of the co-operating side plate, and joined respectively to said side plates, adjacent frames being arranged so that a depending flange of one frame is contiguous to a depending flange of the other frame, the frames defining with the side plates, a series of rectangular spaces, the number of such spaces corresponding to the number of frames, and means for fastening said contiguous flanges together, said end plates being joined to the depending flanges of the corresponding end frames.

2. In a box of the character described, end plates, a plurality of side plates to form each side of the box and placed adjacent one another, means for securing said side plates together, metal frames adjacent the top edges of the plates, each of the frames being formed as an open receptacle adapted to have a cover seated thereon, said frame having depending anchoring projections on two opposite sides, the other pair of opposite sides having a length corresponding to that of the co-operating side plate, and joined respectively to said side plates, and cooperating with recesses extending downwardly in said side plates, said frames having depending flanges on the other two sides, adjacent frames being arranged so that a depending flange of one frame is contiguous to a depending flange of the other frame, the frames defining with the side plates, a series of rectangular spaces, the number of such spaces corresponding to the number of frames, and means for fastening said flanges together, said end plates being joined to the depending flanges of the corresponding end frames.

WILLIAM F. DEAN.
FRANK M. BROOKS.